US012662184B2

(12) United States Patent
Hoshino et al.

(10) Patent No.: US 12,662,184 B2
(45) Date of Patent: Jun. 23, 2026

(54) MOTOR CONTROL DEVICE, MOTOR CONTROL METHOD, STEERING SYSTEM, AND VEHICLE DRIVE SYSTEM

(71) Applicant: HITACHI ASTEMO, LTD., Hitachinaka (JP)

(72) Inventors: Katsuhiro Hoshino, Hitachinaka (JP); Takafumi Hara, Tokyo (JP); Takaya Tsukagoshi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 143 days.

(21) Appl. No.: 18/563,958

(22) PCT Filed: Feb. 15, 2022

(86) PCT No.: PCT/JP2022/005895
§ 371 (c)(1),
(2) Date: Nov. 24, 2023

(87) PCT Pub. No.: WO2023/281794
PCT Pub. Date: Jan. 12, 2023

(65) Prior Publication Data
US 2024/0262413 A1 Aug. 8, 2024

(30) Foreign Application Priority Data
Jul. 8, 2021 (JP) ................................. 2021-113264

(51) Int. Cl.
*H02P 7/00* (2016.01)
*B60L 15/02* (2006.01)
(Continued)

(52) U.S. Cl.
CPC .......... *B62D 5/0472* (2013.01); *B60L 15/025* (2013.01); *H02P 21/05* (2013.01);
(Continued)

(58) Field of Classification Search
CPC .......... H02P 21/22; H02P 21/20; H02P 27/06; H02P 27/08; H02P 6/10; H02P 6/28; B60L 15/025
See application file for complete search history.

(56) References Cited

U.S. PATENT DOCUMENTS

| | | | | |
|---|---|---|---|---|
| 2015/0229250 A1* | 8/2015 | Fukunaga | | H02P 27/08 |
| | | | | 318/400.23 |
| 2023/0008549 A1 | 1/2023 | Tsukagoshi et al. | | |

FOREIGN PATENT DOCUMENTS

| | | | | | |
|---|---|---|---|---|---|
| GB | 2287843 A | * | 9/1995 | | H02J 9/06 |
| JP | 2007-215369 A | | 8/2007 | | |

(Continued)

OTHER PUBLICATIONS

International Search Report with English Translation and Written Opinion in corresponding International Application No. PCT/JP2022/005895, dated Apr. 26, 2022 (8 pages).

*Primary Examiner* — Karen Masih
(74) *Attorney, Agent, or Firm* — Foley & Lardner LLP

(57) ABSTRACT

A motor control device includes: an inverter circuit that drives a motor; and a control unit that generates a current command value on the basis of a torque command to the motor, and outputs a PWM pulse to the inverter circuit on the basis of the current command value to control the inverter circuit, and the control unit sets a phase shift amount of a carrier wave of the PWM pulse, estimates a fluctuating torque according to the phase shift amount, and corrects the current command value on the basis of the fluctuating torque.

13 Claims, 8 Drawing Sheets

(51) Int. Cl.
    *B62D 5/04*          (2006.01)
    *H02P 21/05*       (2006.01)
    *H02P 21/22*       (2016.01)

(52) U.S. Cl.
    CPC ......... *H02P 21/22* (2016.02); *B60L 2240/423*
                (2013.01); *B60L 2240/429* (2013.01)

(56)            References Cited

FOREIGN PATENT DOCUMENTS

| JP | 5949929 B2 * | 7/2016 | .............. H02P 23/00 |
|----|----|----|----|
| JP | 2021-083276 A | 5/2021 | |
| WO | WO-2014/045760 A1 | 3/2014 | |

* cited by examiner

Motor Torqen [Nm]

Motor Speed [r/min]

(B)

iq id

A'

A

CURRENT PHASE (B)

(A)

Motor Speed [r/min]

Motor Torque [Nm]

FIG. 6

MOTOR CONTROL DEVICE, MOTOR CONTROL METHOD, STEERING SYSTEM, AND VEHICLE DRIVE SYSTEM

TECHNICAL FIELD

The present invention relates to a motor control device, a motor control method, a steering system, and a vehicle drive system

BACKGROUND ART

The motor includes a magnetic circuit such as a magnet embedded in a rotor or a coil wound around a stator. Therefore, the motor generates torque pulsation depending on the shape of the magnetic circuit. Further, the motor is driven by the inverter circuit, but due to the control of the inverter circuit, the torque pulsation is also generated by the harmonic included in the current energized from the inverter circuit to the coil of the motor. It is considered that by shifting the phase of the carrier wave used for generating the PWM signal for controlling the inverter circuit, the pulsation due to the magnetic circuit of the motor is canceled by the pulsation due to the control of the inverter circuit.

PTL 1 discloses a motor drive control device including a switching unit that converts a DC voltage into a pseudo AC voltage having an arbitrary frequency and voltage amplitude, a motor that is driven by an output of the switching unit, and a phase adjustment unit that adjusts a phase of a current change component generated by connecting the switching unit and the motor, in which the phase adjustment unit adjusts the phase of the current change component so as to reduce inherent torque unevenness based on a rotational phase of the motor.

CITATION LIST

Patent Literature

PTL 1: JP 2007-215369 A

SUMMARY OF INVENTION

Technical Problem

By shifting the phase of the carrier wave, the pulsation of the motor can be reduced, but the torque of the motor decreases.

Solution to Problem

A motor control device according to the present invention includes: an inverter circuit that drives a motor; and a control unit that generates a current command value on the basis of a torque command to the motor, and outputs a PWM pulse to the inverter circuit on the basis of the current command value to control the inverter circuit, in which the control unit sets a phase shift amount of a carrier wave of the PWM pulse, estimates a fluctuating torque depending on the phase shift amount, and corrects the current command value on the basis of the fluctuating torque.

A motor control method according to the present invention is a motor control method for controlling an inverter circuit by generating a current command value on the basis of a torque command to a motor and outputting a PWM pulse to the inverter circuit on the basis of the current command value, the motor control method including: setting a phase shift amount of a carrier wave of the PWM pulse; estimating a fluctuating torque according to the phase shift amount; and correcting the current command value on the basis of the fluctuating torque.

Advantageous Effects of Invention

According to the present invention, it is possible to reduce motor pulsation and to suppress a decrease in torque of the motor.

BRIEF DESCRIPTION OF DRAWINGS

FIG. 1 is a system configuration diagram including a motor control device.

FIG. 3 is a block configuration diagram of a carrier wave/current command control unit.

FIGS. 4A and 4B are diagrams illustrating a relationship between a torque command and a current command value.

FIGS. 6A and 6B are diagrams illustrating carrier waves and PWM pulses.

DESCRIPTION OF EMBODIMENTS

Figure 2:
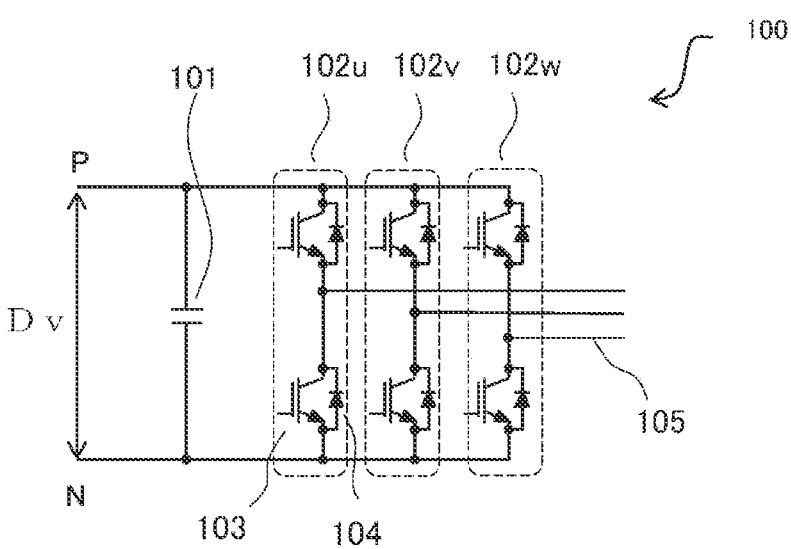
FIG. 2 is a circuit configuration diagram of an inverter circuit.

Hereinafter, embodiments of the present invention will be described with reference to the drawings. The following description and drawings are examples for describing the present invention, and are omitted and simplified as appropriate for the sake of clarity of description. The present invention can be carried out also in various other forms. Unless otherwise specified, each component may be singular or plural.

Figure 1:
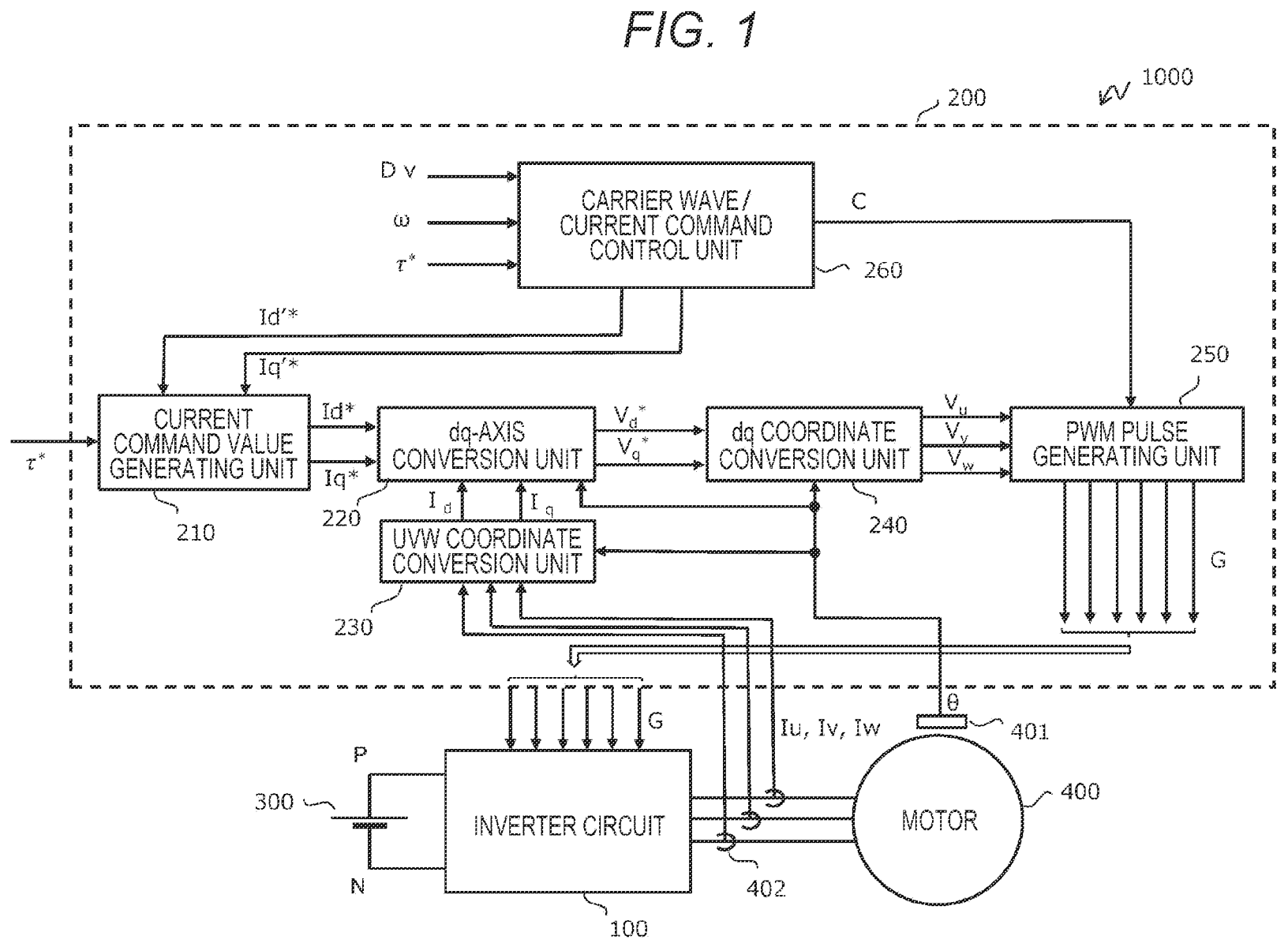

FIG. 1 is a system configuration diagram including a motor control device 1000.

The motor control device 1000 includes an inverter circuit 100 and a control unit 200. DC power is supplied from a DC power supply 300 or the like to the inverter circuit 100. The inverter circuit 100 includes upper and lower arm circuits for three phases. Each arm circuit includes a power semiconductor element for switching and a diode. The power semiconductor element performs switching operation by a PWM pulse G output from the control unit 200. By the switching operation of the power semiconductor element, the inverter circuit 100 converts DC power supplied from the DC power supply 300 into AC power and outputs a three-phase AC current. The three-phase AC current output from the inverter circuit 100 is supplied to a motor 400 to drive the motor 400. The motor 400 will be described as an example of a three-phase motor.

The motor 400 is provided with a magnetic pole position detector 401 that detects the magnetic pole position $\theta$ of the rotor of the motor 400, and the detected magnetic pole position $\theta$ of the rotor is output to the control unit 200. The three-phase AC current between the inverter circuit 100 and the motor 400 is detected by a current detector 402, and the detected current values Iu, Iv, and Iw of the respective phases are output to the control unit 200.

The motor control device 1000 including the inverter circuit 100 and the control unit 200 is mounted on a vehicle such as an electric vehicle or a hybrid vehicle together with, for example, the DC power supply 300 and the motor 400 to drive the vehicle. In the following description, power running for driving the vehicle by the motor 400 will be described as an example, but the same applies to regeneration for causing the motor 400 to function as a generator.

The control unit 200 refers to the current values Iu, Iv, and Iw detected by the current detector 402 and the magnetic pole position θ of the rotor detected by the magnetic pole position detector 401, and calculates a current command value and a voltage command value according to a torque command τ* from a higher-level control device (not illustrated). Then, the PWM pulse G generated by the voltage command value and the carrier wave is output to the inverter circuit 100 to drive the power semiconductor element of the inverter circuit 100. Although details will be described later, the control unit 200 sets the phase shift amount of the carrier wave C of the PWM pulse G, estimates the fluctuating torque according to the phase shift amount, and corrects the current command value on the basis of the fluctuating torque.

The control unit 200 includes a current command value generating unit 210, a dq-axis conversion unit 220, a UVW coordinate conversion unit 230, a dq coordinate conversion unit 240, a PWM pulse generating unit 250, and a carrier wave/current command control unit 260.

The current command value generating unit 210 converts the input torque command τ* into a d-axis current command value $I_d$* and a q-axis current command value $I_q$*. When a corrected d-axis current command value $I_d'$* and a corrected q-axis current command value $I_q'$* are input to the current command value generating unit 210 from the carrier wave/current command control unit 260 to be described later, the corrected d-axis current command value $I_d'$* and the corrected q-axis current command value $I_q'$* are output as a d-axis current command value $I_d$* and a q-axis current command value $I_q$*.

The dq-axis conversion unit 220 converts the d-axis current command value $i_d$* into a d-axis voltage command value $V_d$* on the basis of the magnetic pole position θ of the rotor and the d-axis current value $I_d$ obtained by the UVW coordinate conversion unit 230, and outputs the d-axis voltage command value $V_d$* to the dq coordinate conversion unit 240. Further, the dq-axis conversion unit 220 converts the q-axis current command value $I_q$* into the q-axis voltage command value $V_q$* on the basis of the magnetic pole position θ of the rotor and the q-axis current value $I_q$ obtained by the UVW coordinate conversion unit 230, and outputs the q-axis voltage command value $V_q$* to the dq coordinate conversion unit 240.

The UVW coordinate conversion unit 230 converts the current values Iu, Iv, and Iw detected by the current detector 402 into a d-axis current value $I_d$ and a q-axis current value $I_q$ with reference to the magnetic pole position θ of the rotor, and outputs the d-axis current value $I_d$ and the q-axis current value $I_q$ to the dq-axis conversion unit 220.

The dq coordinate conversion unit 240 converts the d-axis voltage command value $V_d$* and the q-axis voltage command value $V_q$* into voltage command values Vu, Vv, and Vw of three phases of the UVW phases, and outputs the converted values to the PWM pulse generating unit 250.

The PWM pulse generating unit 250 generates a PWM pulse G on the basis of the triangular wave carrier wave C output from the carrier wave/current command control unit 260 and the voltage command values Vu, Vv, and Vw, and drives the power semiconductor element of the inverter circuit 100 including the upper and lower arm circuits for three phases with the generated PWM pulse G.

The carrier wave/current command control unit 260 receives a DC voltage Dv from the DC power supply 300 or a booster circuit to be described later, a rotation speed (rotor phase angular velocity) ω of the motor 400, and a torque command τ* from a high-order control device. The carrier wave/current command control unit 260 shifts the phase of the carrier wave C used for generating the PWM signal for controlling the inverter circuit 100 in order to cancel the pulsation due to the magnetic circuit of the motor 400 by the pulsation due to the control of the inverter circuit 100. When the phase of carrier wave C is shifted, pulsation of motor 400 can be reduced, but the torque of motor 400 decreases. Therefore, the carrier wave/current command control unit 260 estimates the fluctuating torque according to the phase shift amount of the shifted carrier wave C, and corrects the current command value on the basis of the fluctuating torque. The generated carrier wave C is output to the PWM pulse generating unit 250, and the corrected d-axis current command value $I_d'$* and q-axis current command value $I_q'$* are output to the current command value generating unit 210.

Note that the control unit 200 may be configured by a computer including a CPU, a memory, and the like. In this case, the computer performs processing by executing a program stored in a memory or the like. In addition, all processes or some processes may be implemented by a hard logic circuit. Furthermore, the program may be stored in a storage medium in advance and provided. Alternatively, the program may be provided by a network line. The program may be provided as various forms of computer-readable computer program products, such as data signals.

FIG. 2 is a circuit configuration diagram of the inverter circuit 100.

DC voltage Dv is supplied from a DC power supply 300 or the like to the inverter circuit 100. A smoothing capacitor 101 is provided between the positive electrode P and the negative electrode N. Further, upper and lower arm circuits 102u, 102v, and 102w for three phases are connected between the positive electrode P and the negative electrode N. Each of the upper and lower arm circuits 102u, 102v, and 102w includes two power semiconductor elements 103 functioning as switching elements of the upper and lower arms, and a diode 104 provided in parallel with each power semiconductor element 103. The power semiconductor element 103 is, for example, an IGBT. The power semiconductor element performs switching operation by the PWM pulse G from the PWM pulse generating unit 250. As a result, the DC voltage Dv is converted into a three-phase AC current, and the three-phase AC current is output from the upper and lower arm circuits 102u, 102v, and 102w to the windings of each phase of the motor 400 via the AC output lines 105 of each phase.

Figure 3:
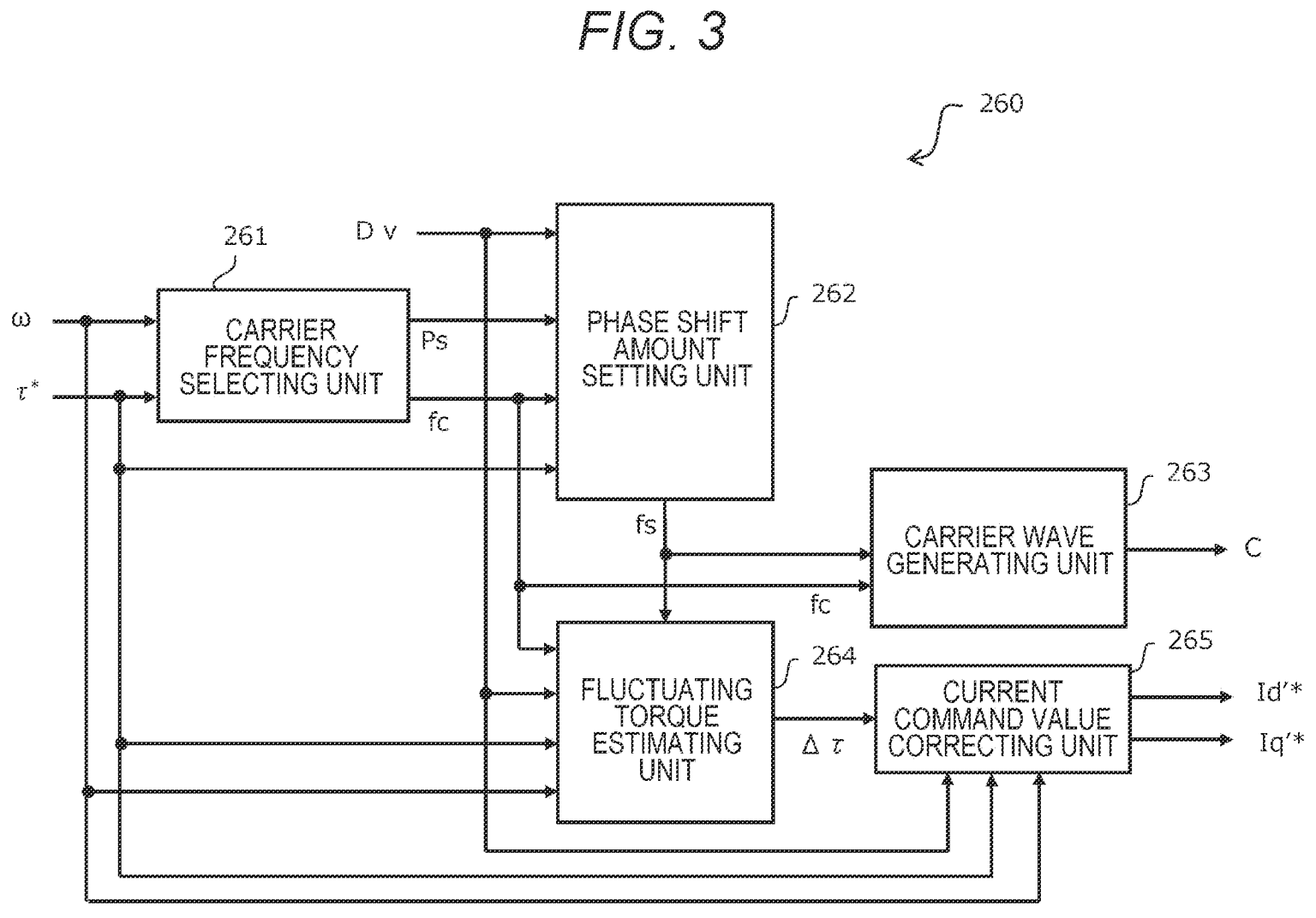

FIG. 3 is a block configuration diagram of the carrier wave/current command control unit 260.

The carrier wave/current command control unit 260 includes a carrier frequency selecting unit 261, a phase shift amount setting unit 262, a carrier wave generating unit 263, a fluctuating torque estimating unit 264, and a current command value correcting unit 265.

The carrier frequency selecting unit 261 receives the rotation speed ω [rpm] of the motor 400 and the torque command τ*, and outputs the carrier frequency fc and the number of synchronization pulses Ps of the PWM pulse G. There is a relationship of the following Formula (1) among the rotation speed ω of the motor 400, the carrier frequency fc, and the number of synchronization pulses Ps.

$$Ps = fc/f1 = fc/(\omega/60 * Pp) \qquad (1)$$

Here, f1 is the fundamental frequency of the motor 400, and Pp is the number of pole pairs of the motor 400.

When any two of the rotation speed ω, the carrier frequency fc, and the number of synchronization pulses Ps of the motor 400 are selected, the other one is obtained by Formula (1). In this example, the rotation speed ω and the carrier frequency fc are selected, and the number of synchronization pulses Ps is obtained by Formula (1).

The carrier frequency fc needs to be selected in consideration of many factors such as heat generation of the motor 400, the inverter circuit 100, and the like, and calculation capability of the control unit 200. The upper limit carrier frequency is determined in consideration of these factors, and the carrier frequency fc and the number of synchronization pulses Ps of the PWM pulse G per electrical angle cycle are selected so as not to exceed the upper limit carrier frequency at the current rotation speed ω of the motor 400. The carrier frequency fc is basically determined according to the rotation speed ω of the motor 400, but the carrier frequency fc is appropriately changed using the rotation speed ω of the motor 400 and the torque command value τ* in a case where responsiveness to torque is increased or in a case where temperature rise of the motor 400, the inverter circuit 100, and the like is suppressed.

The number of synchronization pulses Ps is set to a positive integer. More preferably, the number of synchronization pulses Ps is set to a positive integer and an odd number. In the present embodiment, synchronous PWM control is performed in which the carrier frequency fc is controlled to be an integral multiple of the frequency of the current flowing through the motor 400. When the motor 400 is driven to rotate at a high speed using the asynchronous PWM control, the waveform of the current flowing through the motor 400 does not become a three-phase symmetrical waveform, which causes electromagnetic force pulsation of the motor 400. When the synchronous PWM control is used, the waveform of the current flowing through the motor 400 becomes a three-phase symmetrical waveform, so that the effect of reducing the electromagnetic force pulsation of the motor 400 can be expected as compared with the asynchronous PWM control.

For example, in a case where the upper limit value of the carrier frequency fc is 10,000 Hz and the 8-pole motor is rotated at 12000 rpm, the carrier frequency fc with the number of synchronization pulses Ps of 15 pulses is fc=Ps*f1=15*12000/60*(8/2)=12000 Hz according to Formula (1), which exceeds the upper limit value of the carrier frequency fc, and thus is impossible. For example, the carrier frequency fc with the number of synchronization pulses Ps of 9 pulses is fc=9*f1=9*12000/60*(8/2)=7200 Hz according to Formula (1), which does not exceed the upper limit value of the carrier frequency fc, and thus is acceptable.

The phase shift amount setting unit 262 receives the carrier frequency fc and the number of synchronization pulses Ps of the PWM pulse G from the carrier frequency selecting unit 261, and further receives the torque command τ* and the DC voltage Dv. The relationships between the carrier frequency fc, the number of synchronization pulses Ps, the torque command τ*, and the DC voltage Dv and the phase shift amount fs of the carrier wave C in which the torque pulsation of the motor 400 is minimized are obtained in advance by simulation, experiment, or the like, and these relationships are stored as a map in the memory in the phase shift amount setting unit 262. Not only the map but also a mathematical expression may be stored. The phase shift amount setting unit 262 refers to a map or the like on the basis of the carrier frequency fc, the number of synchronization pulses Ps, the torque command τ*, and the DC voltage Dv that are input, and outputs the phase shift amount fs of the carrier wave C having the smallest torque pulsation.

The pulsation of the electromagnetic force generated in the motor 400 is a change in the electromagnetic force generated in the rotor by energizing a current from the inverter circuit 100 to the motor 400. The pulsation of the electromagnetic force generated by the motor 400 is roughly divided into a torque pulsation which is a pulsation component generated in the circumferential direction of the motor 400 and an electromagnetic exciting force which is a pulsation component generated in the radial direction of the motor 400. The phase shift amount setting unit 262 selects one of the torque pulsation generated in the circumferential direction of the motor 400 and the electromagnetic exciting force generated in the radial direction of the motor 400, and sets the phase shift amount fs of the carrier wave C so as to reduce the selected torque pulsation or electromagnetic exciting force.

The carrier wave generating unit 263 receives the carrier frequency fc selected by the carrier frequency selecting unit 261 and the phase shift amount fs of the carrier wave C set by the phase shift amount setting unit 262, generates a triangular carrier wave C on the basis of the received carrier frequency fc and phase shift amount fs, and outputs the carrier wave C to the PWM pulse generating unit 250. The frequency of the carrier wave C is the carrier frequency fc, and the phase of the carrier wave C is shifted by an electrical angle indicated by the phase shift amount fs.

The fluctuating torque estimating unit 264 receives the DC voltage Dv, the carrier frequency fc, the torque command τ*, the rotation speed ω of the motor 400, and the phase shift amount fs, and outputs the fluctuating torque Δτ to the current command value correcting unit 265 on the basis of these input values. The relationships with the fluctuating torque Δτ such as a decrease in the torque of the motor 400 are obtained in advance by simulation, experiment, or the like according to the DC voltage Dv, the carrier frequency fc, the torque command τ*, the rotation speed ω of the motor 400, and the phase shift amount fs, and these relationships are stored as a map in the memory in the fluctuating torque estimating unit 264. Not only the map but also a mathematical expression may be stored. The fluctuating torque estimating unit 264 refers to a map or the like according to the DC voltage Dv, the carrier frequency fc, the torque command τ*, the rotation speed ω of the motor 400, and the phase shift amount fs that are input to obtain the fluctuating torque Δτ of the motor 400, and outputs it to the current command value correcting unit 265. The fluctuating torque Δτ is a torque fluctuated as compared with the torque of the motor 400 according to the torque command τ* when the phase of the carrier wave C is not shifted.

The current command value correcting unit 265 receives the fluctuating torque Δτ, the DC voltage Dv, the torque command τ*, and the rotation speed ω of the motor 400, corrects the current command value on the basis of these input values, and outputs the corrected d-axis current command value $I_d'^*$ and q-axis current command value $I_q'^*$ to the current command value generating unit 210. The relationships between the fluctuating torque Δτ, the DC voltage Dv, the torque command $\tau^*$, the rotation speed $\omega$ of the motor 400, and the d-axis current command value $I_d{'}^*$ and the q-axis current command value $I_q{'}^*$ are obtained in advance by simulation, experiment, or the like, and these relationships are stored as a map in the memory in the current command value correcting unit 265. Not only the map but also a mathematical expression may be stored. Based on this map or the like, the d-axis current command value $I_d{'}^*$ and the q-axis current command value $I_q{'}^*$ are determined so that the output torque of the motor 400 matches the output torque according to the torque command $\tau^*$ when the phase of the carrier wave C is not shifted.

Figure 4:
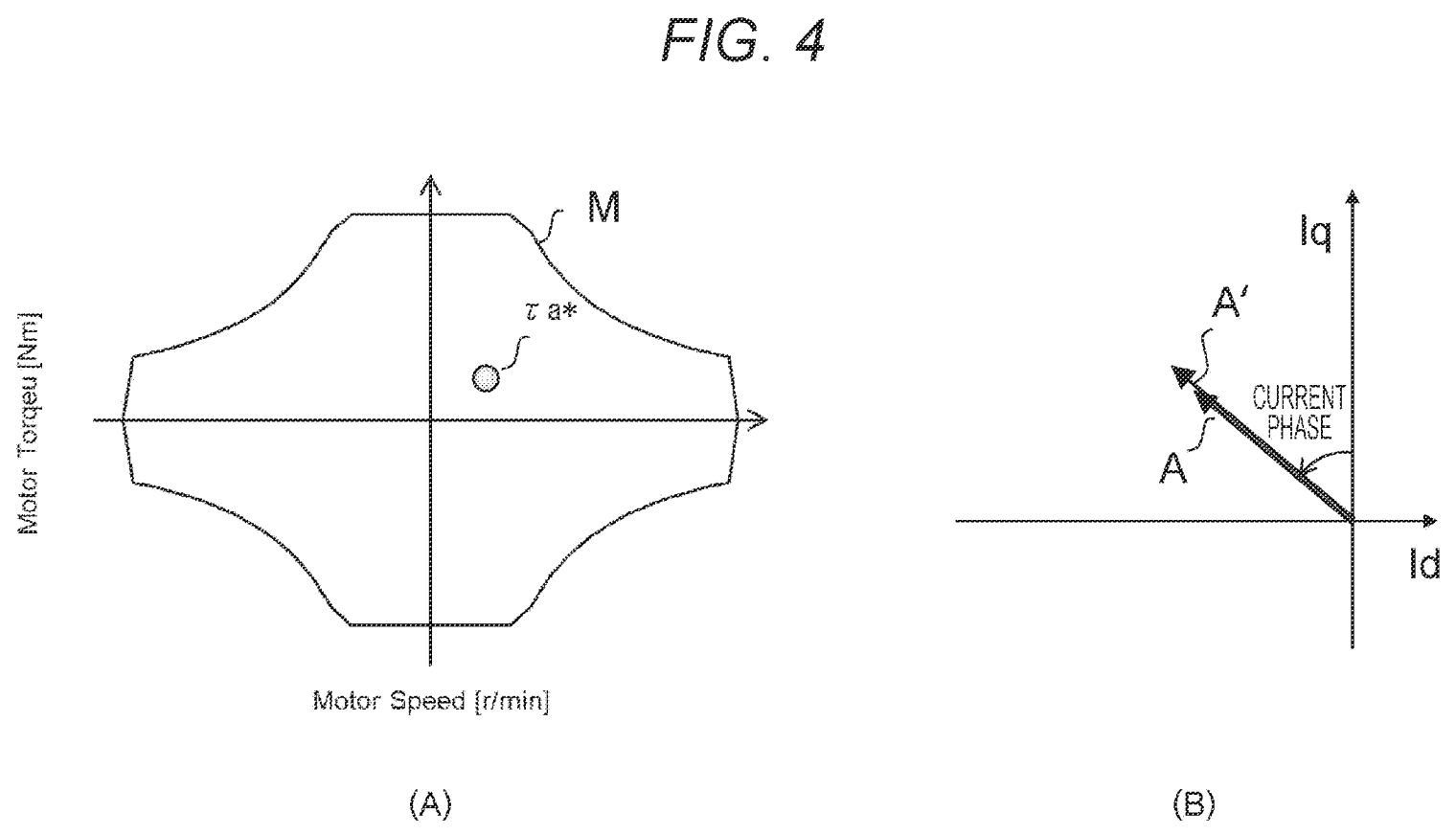

FIGS. 4(A) and 4(B) are diagrams illustrating a relationship between the torque command $\tau^*$ and the current command value.

FIG. 4(A) is a diagram illustrating the relationship between the rotation speed $\omega$ of the motor 400, the output torque, and the torque command $\tau a^*$, where the horizontal axis represents the rotation speed $\omega$ of the motor 400, and the vertical axis represents the output torque. A case where the torque command $\tau a^*$ is in a region where the rotation speed $\omega$ of the motor 400 is low is illustrated. The torque command $\tau a^*$ is in a range M in which the motor 400 can operate.

In FIG. 4(B), the horizontal axis represents the d-axis current command value, and the vertical axis represents the q-axis current command value. It is assumed that the current command value A (d-axis current command value Ida*, q-axis current command value Iqa*) is output when the phase of the carrier wave C is shifted corresponding to the torque command $\tau a^*$, and the current command value A' (d-axis current command value Ida*', q-axis current command value Iqa*') is output when the phase of the carrier wave C is not shifted. When shifting the phase of the carrier wave C, the current command value correcting unit 265 corrects the amplitude so that the vector of the current command value A becomes the vector of the current command value A' in the region where the rotation speed $\omega$ is low.

Figure 5:
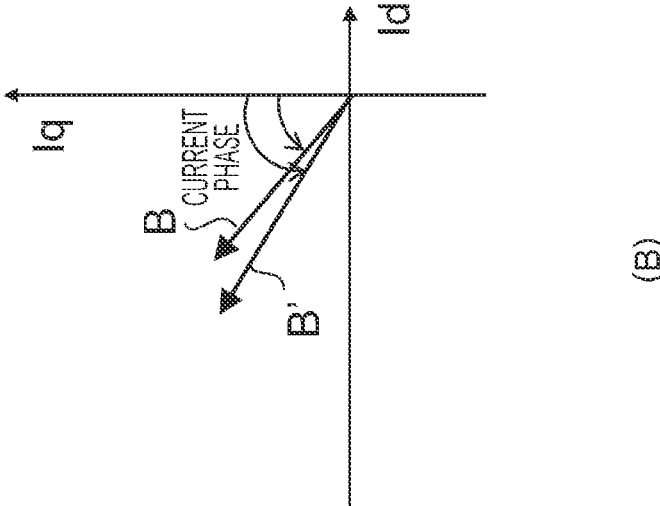
FIGS. 5A and 5B are diagrams illustrating a relationship between a torque command and a current command value.

FIGS. 5(A) and 5(B) are diagrams illustrating a relationship between the torque command $\tau^*$ and the current command value.

FIG. 5(A) is a diagram illustrating the relationship between the rotation speed $\omega$ of the motor 400, the output torque, and the torque command $\tau b^*$, where the horizontal axis represents the rotation speed $\omega$ of the motor 400, and the vertical axis represents the output torque. A case where the torque command $\tau b^*$ is in a region where the rotation speed $\omega$ of the motor 400 is high is illustrated.

In FIG. 5(B), the horizontal axis represents the d-axis current command value, and the vertical axis represents the q-axis current command value. It is assumed that the current command value B (d-axis current command value Idb*, q-axis current command value Iqb*) is output when the phase of the carrier wave C is shifted corresponding to the torque command $\tau b^*$, and the current command value B' (d-axis current command value Idb*', q-axis current command value Iqb*') is output when the phase of the carrier wave C is not shifted. In a case where the phase of the carrier wave C is shifted, voltage limitation occurs in a region where the rotation speed $\omega$ is high, and thus, the current command value correcting unit 265 corrects the amplitude and the phase so that the vector of the current command value B becomes the vector of the current command value B'.

In a region where the rotation speed $\omega$ of the motor 400 is low, the current command value correcting unit 265 corrects the amplitude so that the vector of the current command value A becomes the vector of the current command value A' as illustrated in FIGS. 4(A) and 4(B). In a region where the rotation speed $\omega$ of the motor 400 is high, as illustrated in FIGS. 5(A) and 5(B), the amplitude and the phase are corrected so that the vector of the current command value B becomes the vector of the current command value B'. In other words, the current command value correcting unit 265 changes the ratio between the d-axis current command value and the q-axis current command value of the current command value according to the rotation speed $\omega$ of the motor 400.

When the phase of the carrier wave C is shifted to reduce the torque pulsation, the output torque of the motor 400 tends to decrease when the rotation speed $\omega$ of the motor 400 is high and the torque command $\tau b^*$ is low. Also in this case, since the current command value is corrected according to the phase shift amount fs, a desired torque can be secured while reducing the torque pulsation.

Figure 6:
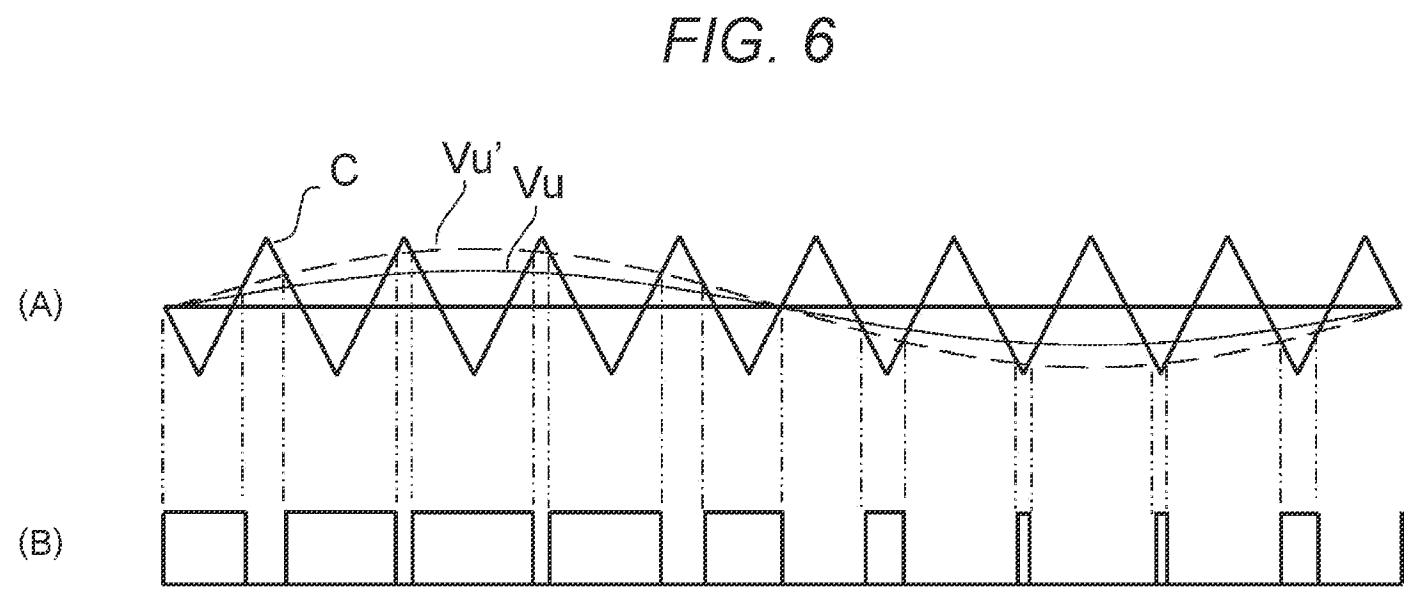

FIGS. 6(A) and 6(B) are diagrams illustrating the carrier wave C and the PWM pulse G.

FIG. 6(A) illustrates a carrier wave C with the number of synchronization pulses Ps of 9 pulses per electrical angle cycle. The phase of carrier wave C is shifted by an electrical angle indicated by the phase shift amount fs. The phase shift amount fs is a value at which the torque pulsation is minimized. In FIG. 6(A), a U-phase voltage command value Vu' based on the d-axis current command value $I_d{'}^*$ and the q-axis current command value $I_q{'}^*$ corrected by the current command value correcting unit 265 is indicated by a broken line. The U-phase voltage command value Vu based on the uncorrected d-axis current command value $I_d{}^*$ and q-axis current command value $I_q{}^*$ is indicated by a solid line. Although the voltage command value of only the U phase is illustrated and the voltage command value of the V phase and the voltage command value of the W phase are not illustrated, when one electrical angle cycle is 360 degrees, the voltage command values of the three phases of the UVW phases are shifted from each other by 120 degrees.

FIG. 6(A) illustrates the carrier wave C and the voltage command value Vu after shifting the phase of the carrier wave C. When the current control is performed using the voltage command value Vu before shifting the phase of the carrier wave C after shifting the phase of the carrier wave C, the pulsation of the motor 400 can be reduced, but the torque of the motor 400 decreases.

The carrier wave/current command control unit 260 estimates the fluctuating torque $\Delta\tau$ according to the phase shift amount fs of the carrier wave C, and corrects the current command value to the d-axis current command value $I_d{'}^*$ and the q-axis current command value $I_q{'}^*$ on the basis of the fluctuating torque $\Delta\tau$. The corrected d-axis current command value $I_d{'}^*$ and q-axis current command value $I_q{'}^*$ are input to the current command value generating unit 210, and the current command value generating unit 210 outputs the corrected d-axis current command value $I_d{'}^*$ and q-axis current command value $I_q{'}^*$ that are input. Then the dq-axis conversion unit 220 converts the d-axis current command value $I_d{'}^*$ and q-axis current command value $I_q{'}^*$ into the d-axis voltage command value $V_d{}^*$ and q-axis voltage command value $V_q{}^*$, and the dq coordinate conversion unit 240 converts the d-axis voltage command value $V_d{}^*$ and q-axis voltage command value $V_q{}^*$ into the voltage command value. As a result, the amplitude of the voltage command value Vu' is increased so as to match the output torque by the torque command $\tau^*$ when the phase of the carrier wave C is not shifted. The voltage command value Vu' in FIG. 6(A) indicates this state. In this example, as described with reference to FIG. 4, the amplitude is corrected so that the vector of the current command value A becomes the vector of the current command value A', and the phase is kept as it is.

As illustrated in FIG. 6(B), the PWM pulse generating unit 250 compares the voltage command value Vu' with the carrier wave C to generate the PWM pulse G. Since the amplitude of the voltage command value Vu' is larger than that of the voltage command value Vu, the pulse width of the PWM pulse G also increases. The AC current flowing through the motor 400 by the inverter circuit 100 driven by the PWM pulse G also increases, and the output torque of the motor 400 can be increased. As a result, pulsation of the motor 400 can be reduced, and a decrease in torque of the motor 400 can be suppressed.

When the amplitude of the carrier wave C is Eb and the amplitude of the voltage command value V (Vu', Vv', Vw') is Es, the voltage amplitude ratio M is expressed by Es/Eb. The amplitude Eb of the carrier wave C coincides with the upper limit of the DC voltage Dv. The amplitude Es of the voltage command value V is determined by the corrected current command value A'. The current command value correcting unit 265 sets the corrected current command value A' to an appropriate value such that the amplitude Es of the voltage command value V does not exceed the amplitude Eb of the carrier wave C, that is, the PWM pulse G can drive the power semiconductor element 103 of the upper and lower arm circuits of the inverter circuit 100. In other words, the current command value correcting unit 265 sets the current command value A' on the basis of the voltage amplitude ratio M between the amplitude of the DC voltage Dv input to the inverter circuit 100 and the amplitude of the voltage command value V to be output.

Figure 7:
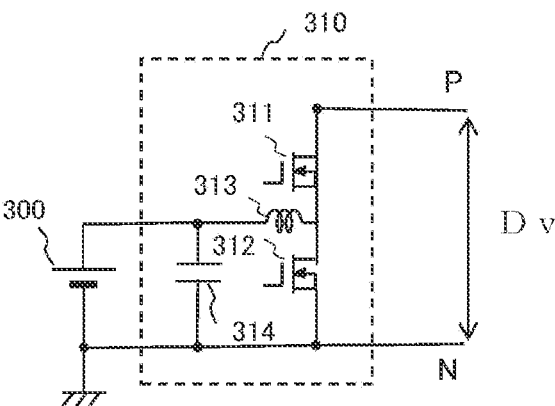
FIG. 7 is a circuit configuration diagram of a booster circuit.

FIG. 7 is a circuit configuration diagram of a booster circuit 310.

The booster circuit 310 is provided between the DC power supply 300 and the inverter circuit 100, boosts the DC voltage of the DC power supply 300, and supplies the DC power to the inverter circuit 100. Note that the booster circuit 310 is not necessarily provided, and is appropriately provided in consideration of the modulation rate M and the like.

In the booster circuit 310, the switching elements 311 and 312 are connected in series, and the DC power supply 300 is connected to an intermediate connection point of the switching elements 311 and 312 connected in series via a reactor 313. A capacitor 314 is connected in parallel with the DC power supply 300.

The booster circuit 310 boosts the DC voltage supplied from the DC power supply 300 to the most efficient DC voltage Dv of the motor control device 1000 by a command given by the control unit 200 and switching operation of each of the switching elements 311 and 312. The boosted DC voltage Dv is supplied to the inverter circuit 100. The inverter circuit 100 operates on the basis of the PWM pulse G output from the control unit 200, and performs power conversion from the DC power boosted by the booster circuit 310 to the AC power.

Figure 8:
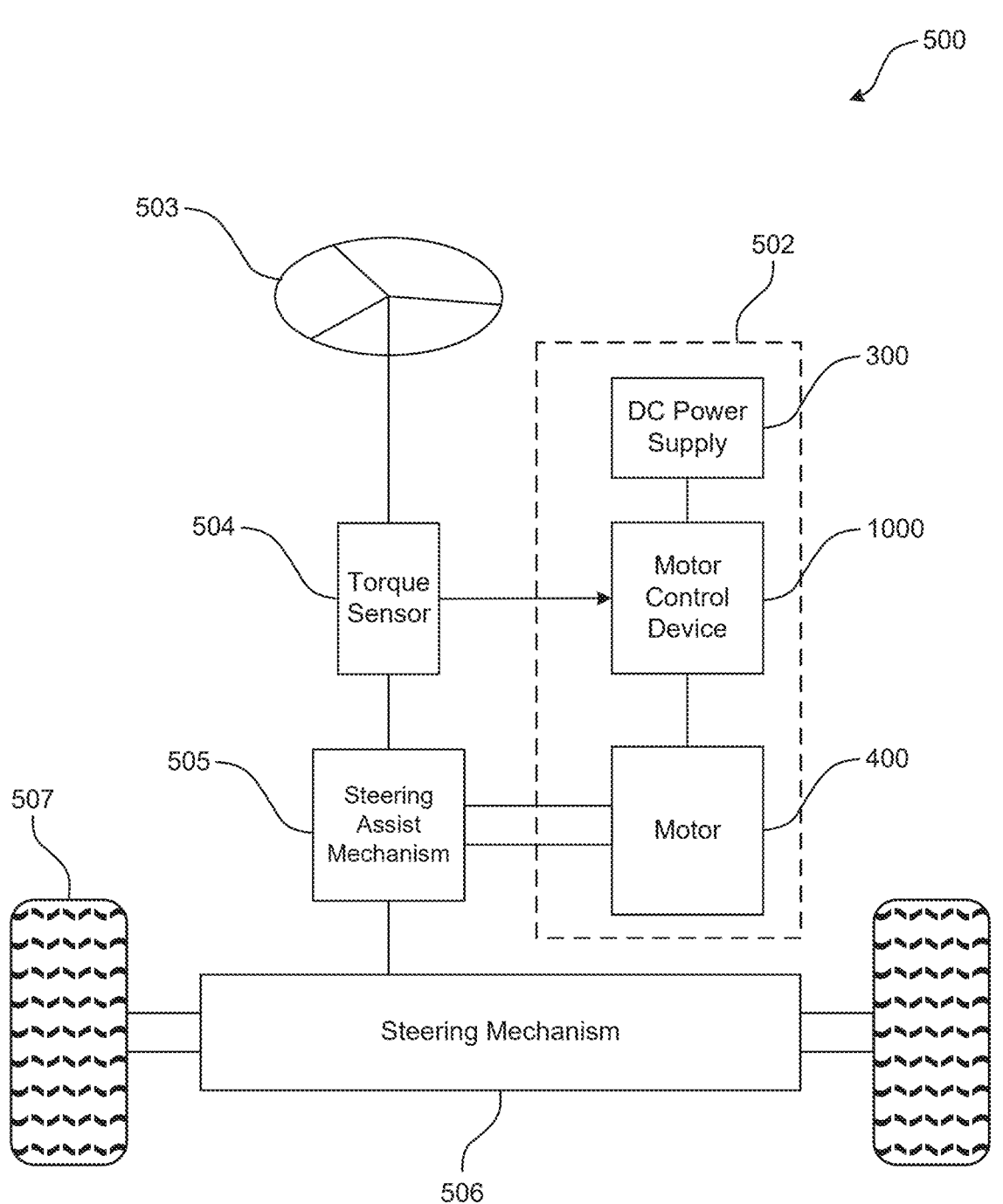
FIG. 8 is a system configuration diagram of a steering system.

FIG. 8 is a system configuration diagram of a steering system 500. FIG. 8 illustrates an example in which the motor control device 1000 according to the present embodiment is applied to the steering system 500.

The steering system 500 includes a drive control system 502 including a DC power supply 300, a motor control device 1000, and a motor 400. In the steering system 500, a rotational torque of a steering wheel 503 is detected by a torque sensor 504, and the drive control system 502 is operated on the basis of the rotational torque. As a result, an assist torque according to the input of the steering wheel 503 is generated and output to a steering mechanism 506 via a steering assist mechanism 505 to assist the steering force. As a result, a tire 507 is steered by the steering mechanism 506, and the traveling direction of the vehicle is controlled.

Generally, since the steering system 500 of the vehicle is directly connected to a driver via the steering wheel 503, vibration and noise due to pulsation of the motor 400 are easily transmitted to the driver. By using the motor control device 1000 of the present embodiment, pulsation of the motor 400 can be reduced, and a decrease in torque of the motor 400 can be suppressed.

FIG. 8 illustrates an example in which the motor control device 1000 according to the present embodiment is applied to the steering system 500, but it may be applied to a vehicle drive system such as an electric vehicle or a hybrid vehicle. In the case of an electric vehicle, the vehicle drive system includes a motor 400 controlled by a motor control device 1000, and the motor 400 drives and controls the vehicle. In the case of a hybrid vehicle, the vehicle drive system includes an internal combustion engine that drives the vehicle and a motor 400 controlled by the motor control device 1000, and drives and controls the vehicle by the motor 400 and the internal combustion engine. In either case, the pulsation of the motor 400 can be reduced, and the decrease in the torque of the motor 400 can be suppressed.

According to the embodiments described above, the following operational effects can be obtained.

(1) The motor control device 1000 includes an inverter circuit 100 that drives a motor 400, and a control unit 200 that generates current command values $I_d^*$ and $I_q^*$ on the basis of a torque command $\tau^*$ to the motor 400 and outputs a PWM pulse G to the inverter circuit 100 on the basis of the current command values $I_d^*$ and $I_q^*$ to control the inverter circuit 100. The control unit 200 sets a phase shift amount fs of a carrier wave C of the PWM pulse G, estimates a fluctuating torque $\Delta\tau$ according to the phase shift amount fs, and corrects the current command values $I_d'^*$ and $I_q'^*$ on the basis of the fluctuating torque $\Delta\tau$. Thus, pulsation of the motor can be reduced, and a decrease in torque of the motor can be suppressed.

(2) The motor control method is a motor control method for controlling an inverter circuit 100 by generating current command values $I_d^*$ and $I_q^*$ on the basis of a torque command $\tau^*$ to the motor 400 and outputting a PWM pulse G to the inverter circuit 100 on the basis of the current command values $I_d^*$ and $I_q^*$, in which a phase shift amount fs of a carrier wave C of the PWM pulse G is set, a fluctuating torque $\Delta\tau$ according to the phase shift amount fs is estimated, and the current command values $I_d'^*$ and $I_q'^*$ are corrected on the basis of the fluctuating torque $\Delta\tau$. Thus, pulsation of the motor can be reduced, and a decrease in torque of the motor can be suppressed.

The present invention is not limited to the above-mentioned embodiments, and other forms conceivable within the scope of the technical idea of the present invention are also included in the scope of the present invention as long as the characteristics of the present invention are not impaired. In addition, the above-described embodiments and application examples may be combined.

REFERENCE SIGNS LIST

100 inverter circuit
101 smoothing capacitor

102*u*, 102*v*, 102*w* upper and lower arm circuit
103 power semiconductor element
104 diode
105 AC output line
200 control unit
210 current command value generating unit
220 dq-axis conversion unit
230 UVW coordinate conversion unit
240 dq coordinate conversion unit
250 PWM pulse generating unit
260 carrier wave/current command control unit
261 carrier frequency selecting unit
262 phase shift amount setting unit
263 carrier wave generating unit
264 fluctuating torque estimating unit
265 current command value correcting unit
300 DC power supply
400 motor
401 magnetic pole position detector
402 current detector
1000 motor control device
Iu, Iv, Iw current value
$\tau^*$ torque command
G PWM pulse
C carrier wave
fc carrier frequency
Ps number of synchronization pulses
fs phase shift amount
$\Delta\tau$ fluctuating torque
$I_d{}^*$, $I_d{}'^*$ d-axis current command value
$I_q{}^*$, $I_q{}'^*$ q-axis current command value
Vu, Vv, Vw voltage command value
$I_d$ d-axis current value
$I_q$ q-axis current value
$\theta$ magnetic pole position

The invention claimed is:

1. A motor control device, comprising:
an inverter circuit that drives a motor; and
a control unit that generates a current command value on a basis of a torque command to the motor, and outputs a PWM pulse to the inverter circuit on a basis of the current command value to control the inverter circuit,
wherein the control unit sets a phase shift amount of a carrier wave of the PWM pulse, estimates a fluctuating torque according to the phase shift amount, corrects the current command value on a basis of the fluctuating torque, and includes a carrier frequency selecting unit that selects a carrier frequency of the carrier wave and a number of synchronization pulses of the PWM pulse per electrical angle cycle, and
wherein the carrier frequency selecting unit sets the number of synchronization pulses to a positive integer.

2. The motor control device according to claim 1, wherein the carrier frequency selecting unit sets the number of synchronization pulses to an odd number.

3. The motor control device according to claim 1, wherein the control unit includes a phase shift amount setting unit that sets the phase shift amount on a basis of a DC voltage input to the inverter circuit, the number of synchronization pulses, the carrier frequency, and the torque command, and
the phase shift amount setting unit selects one of torque pulsation generated in a circumferential direction of the motor and an electromagnetic exciting force generated in a radial direction of the motor, and sets the phase shift amount so as to reduce the selected torque pulsation or the electromagnetic exciting force.

4. The motor control device according to claim 3, wherein the control unit includes a fluctuating torque estimating unit that estimates the fluctuating torque on a basis of the DC voltage input to the inverter circuit, the carrier frequency, the torque command, a rotation speed of the motor, and the phase shift amount.

5. The motor control device according to claim 4, wherein the control unit includes a carrier wave generating unit that generates the carrier wave on a basis of the carrier frequency and the phase shift amount.

6. The motor control device according to claim 5, wherein the control unit includes a current command value correcting unit that corrects the current command value on a basis of the DC voltage input to the inverter circuit, the rotation speed of the motor, the torque command, and the fluctuating torque.

7. The motor control device according to claim 6, wherein the current command value correcting unit changes a ratio between a d-axis current command value and a q-axis current command value of the current command value according to the rotation speed of the motor.

8. The motor control device according to claim 6, wherein the current command value correcting unit sets the current command value on a basis of a voltage amplitude ratio between an amplitude of the DC voltage input to the inverter circuit and an amplitude of a voltage command value to be output.

9. The motor control device according to claim 1, further comprising:
a DC power supply that supplies a DC voltage to the inverter circuit; and
a booster circuit that boosts the DC voltage of the DC power supply.

10. A steering system, comprising:
the motor control device according to claim 1; and
the motor controlled by the motor control device,
wherein the motor controls a steering of a vehicle.

11. A vehicle drive system, comprising:
the motor control device according to claim 1; and
the motor controlled by the motor control device,
wherein the motor drives and controls a vehicle.

12. A vehicle drive system, comprising:
the motor control device according to claim 1;
an internal combustion engine; and
the motor controlled by the motor control device,
wherein the motor and the internal combustion engine drive and control a vehicle.

13. A motor control method for controlling an inverter circuit by generating a current command value on a basis of a torque command to a motor and outputting a PWM pulse to the inverter circuit on a basis of the current command value, the motor control method comprising:
selecting a carrier frequency of a carrier wave and a number of synchronization pulses of the PWM pulse per electrical angle cycle,
setting the number of synchronization pulses to a positive integer,
setting a phase shift amount of the carrier wave of the PWM pulse,
estimating a fluctuating torque according to the phase shift amount, and
correcting the current command value on a basis of the fluctuating torque.

* * * * *